Sept. 19, 1950　　　H. KETEL　　　2,522,791
HITCH PINTLE HOOK
Filed May 9, 1949

INVENTOR
HENRY KETEL
BY *Lawrence and Van Antwerp*
ATTORNEYS

Patented Sept. 19, 1950

2,522,791

UNITED STATES PATENT OFFICE 2,522,791

HITCH PINTLE HOOK

Henry Ketel, Holland, Mich., assignor to Holland Hitch Company, Holland, Mich., a corporation of Michigan Application May 9, 1949, Serial No. 92,150

2 Claims. (Cl. 280—33.15)

This invention relates to a hitch pintle hook, which is of utility in connecting a truck, tractor or other pulling vehicle with a second vehicle which is to be pulled by it.

The connection between a pulling vehicle and one drawn thereby, in the present invention, is through the use of a hook connected to one of the vehicles, in general the one which is doing the pulling, and with which a link connected to the pulled vehicle is detachably connected. The link may embrace the hook and have a part come in front of it so that when thus connected, the vehicle is pulled and drawn over the road. With the present invention it is an object and purpose to provide a simple and easily operated latch in conjunction with the hook structure which, when in its operative position, is latched to lock the link against disengagement from the hook by upward movement with respect thereto.

Of greater importance, it is an object and purpose of the present invention to provide a very novel, practical means for eliminating jars and shocks between the coupling means of the two vehicles. The link is quickly and readily connected with the hook and after such connection, novel means are provided for forcing such means against the hook to yieldingly resist movement of it away therefrom. This eliminates lost motion between the coupling link and hook, with an elimination of taking up slack between the pulling and pulled vehicles when, as happens at times, the pulled vehicle under its momentum may tend to move faster than the vehicle drawing it. There are many other conditions which may result in slack existing between the coupling members which it is an object and purpose of the present invention to prevent and take care of, at the same time providing cushioning means so that any shocks occurring between the two vehicles are cushioned and absorbed without undue strain of any parts of the hook, link or other portions of the coupling means used.

Figure 1:
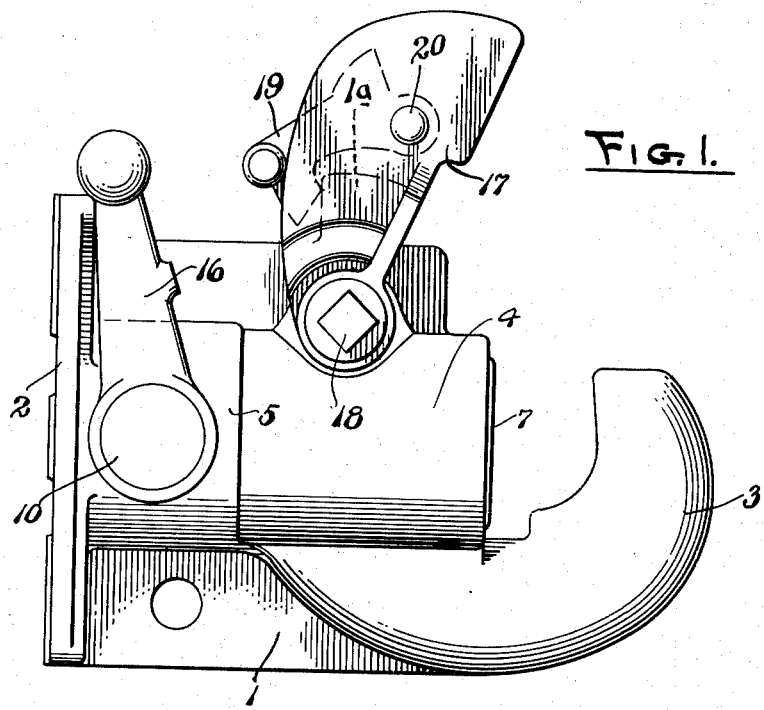
Figure 2:
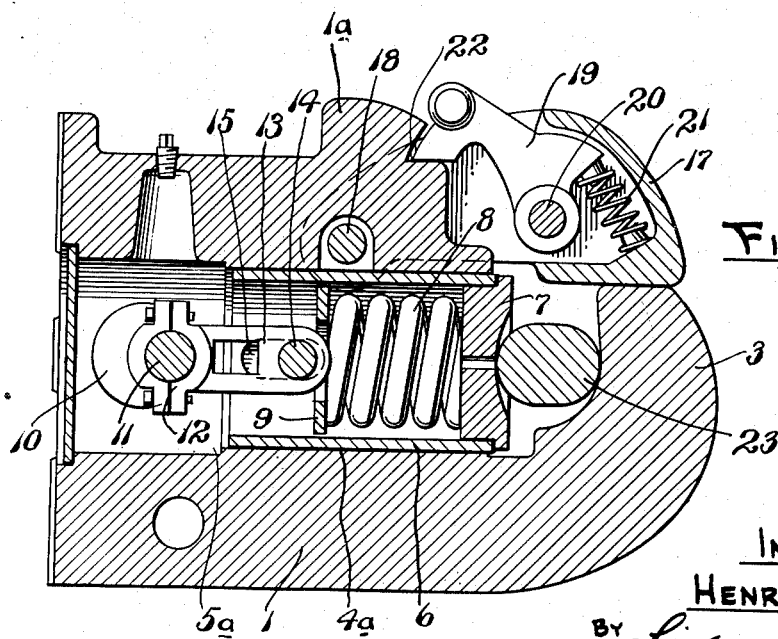

An understanding of the invention may be had from the following description, taken in connection with the accompanying drawing, in which, Fig. 1 is an elevation of the hitch pintle hook of my invention, and Fig. 2 is a longitudinal vertical section therethrough, the latch being shown in closed operative position in Fig. 2, and in raised position in Fig. 1.

Like reference characters refer to like parts in the different figures of the drawing.

In the construction shown a relatively heavy body 1 extending horizontally from a transversely positioned attaching flange 2 at one end, at the opposite end terminates in a thickened and heavy upwardly turned hook 3. The body 1, between the hook and the flange 2 and between its upper and lower sides, is cylindrically enlarged to provide cylindrical housings 4 and 5 in axial alignment, which have cylindrical openings or passages 4a and 5a therethrough from the flanged end of the body to the outer end of the cylinder 4 which is spaced a short distance from the inner side of the hook 3 as shown in Fig. 1.

A cylindrical sleeve 6 is slidably mounted for longitudinal movement lengthwise of the passage 4a. At its outer end it is closed with a head 7 permanently attached therewith. Back of the head 7 a heavy coiled compression spring 8 is located within the sleeve 6. The spring at its inner end bears against a floating disk 9 having a central opening. The spring 8 is short in length so that the disk 9 is located a distance from the inner end of the sleeve 6 (Fig. 2).

A horizontal shaft 10 extends transversely across the cylindrical passage 5a, and within said passage, is provided with a crank pin 11 eccentrically offset from the center of the shaft 10 so that the shaft 10 in effect is a crankshaft. With the crank pin 11 a coupling connection 12 is associated, being connected thereto, from which a bar 13 extends into the rear end portion of the sleeve 6 and at its free end may pass to the opening of the disk 9. A cross pin 14 is mounted adjacent the free end of the bar 13 bearing against the inner side of the disk 9. The ends of the pins 14 extend into short longitudinal slots 15 in opposite sides of the cylindrical sleeve 6. The crankshaft 10 may be rocked about its longitudinal axis by means of a hand operated crank or handle 16, fixed thereto at one of its ends outside of the cast body 1.

It is apparent that by reason of the slots 15 there is provided a lost motion connection between the sleeve 6 and the crankshaft 10, but that upon throwing the crankshaft in a counterclockwise direction a sufficient distance until the inner ends of the slots 15 are reached by the pin 14 no movement of the sleeves 6 occurs, but on a continued rotation the sleeve and the head 7 at its outer end are withdrawn substantially to the position of the head in Fig. 1, with the crank arm 16 in upper position. But upon moving said arm or handle 16 in a clockwise direction, after the movement has proceeded far enough that the pin 14 at its ends against the disk 9 the sleeve 6 and head 7 will be moved outwardly, if free to do so, until, the outer ends of the slots 15 are substantially reached by the pin 14. At the inner position of the head 7, as in Fig. 1, ample space is provided for the entrance of a coupling link between such head and the hook.

A locking latch 17 of the form shown is pivotally connected at one end, at 18 so that it may be turned between upper inoperative and lower operative positions, respectively shown in Figs. 1 and 2. In its operative position, as in Fig. 2, the latch extends over and bridges across the upper open end of the slot between the head 7 and the hook 3. In such position it is held normally against moving to its upper unlatched position by a latching dog 19, pivotally carried by the latch member 17, being mounted thereon at one end by means of a pivot 20. A coiled compression spring 21 carried by the latch member 17 and bearing against the dog 19 normally turns the dog in a counter-clockwise direction so that its free end is received in a keeper recess 22 formed at the upper side of the body 1, in front of an upward projection 1a on the body, as best shown in Fig. 2. By grasping the dog 19 by suitable handle means adjacent its free end, it may be turned clockwise to disengage from the keeper recess at 22, whereupon the latch may be lifted, the free end of the dog riding upon the upper surface on the projection 1a until it passes to the rear thereof (Fig. 1), serving in such position to releasably hold the latch in its upper released position.

When a coupling is to be made with the latch hook, the end of a link 23 for such coupling is dropped into the space between the hook 3 and the outer side of the head 7, with the head withdrawn and the crank handle 16 in upper position. The locking latch 17 is also in upper position. After the end of the link, which in practice may connect two spaced sides thereof which pass by and embrace opposite sides of the hook 3, is dropped in place, the holding latch 17 is released and moved to the position in Fig. 2, the latching dog automatically snapping at its free end into the recess 22. Then the handle 16 is turned clockwise through an arc of 180° or slightly more, or until stopped by coming against flange 2. This moves the sleeve and head outwardly until the head 7 engages the coupling link 23 at one side and forces it at the other side against the hook 3. Such engagement will take place before the completion of movement of the crank arm or handle 16, whereupon to complete the movement, the pin 14 bearing against the disk 9 will continue its movement and compress spring 8. Such compression while of small distance, so far as decreasing the axial length of spring 8, causes the spring 8 to transmit a heavy force to the head 7 to hold the coupling at 23 in snug pressure engagement against the inner side of the hook 3. At the same time spring 8 being yieldable upon a heavy pressure force thereagainst, jars and shocks transmitted by the coupling to the head 17 will be absorbed by the spring with insurance against fracture or other breakage of the body 1 of the device. Jars and shocks are readily absorbed without a separation of the coupling member 23 from the inner side on the hook 3, and all slackness and lost motion are substantially done away with.

The structure described is exceptionally strong, sturdy and durable, simple in construction, readily produced, and in practice, is entirely satisfactory for the purposes it is to fill.

The invention is defined in the appended claims and is to be considered comprehensive of all forms of structure coming within their scope.

I claim:

1. In a structure as described, a body having a horizontal longitudinal passage therethrough of cylindrical form and having an upwardly turned hook at its outer end, the inner side of which is spaced from the end of said passage, a cylindrical sleeve slidably mounted in the passage, a head closing the outer end of the sleeve having a face generally parallel to the inner side of the hook, a heavy coiled compression spring within said sleeve having one end bearing against the head, a disk against which the opposite end of the spring bears, said disk being located and movable within the sleeve, and manually operable means operable from outside of said body, including means for forcing said disk against the spring to tend to move said sleeve and head toward the hook on operation of the manual operable means in one direction, and for withdrawing the sleeve on operation of the manually operable means in the opposite direction.

2. A structure as defined in claim 1, said manually operable means comprising, a crankshaft mounted for rocking movements transversely of and adjacent the inner end of the body, a connecting rod connected to said crankshaft extending into the sleeve and adapted to be moved back and forth on rocking the crankshaft, a transverse pin extending through said connecting rod adjacent its free end back of said disk, said sleeve having diametrically opposed slots into which the ends of said pin extend, and a handle at the outer end of the crankshaft for imparting rocking movement, thereto.

HENRY KETEL.

REFERENCES CITED

The following references are of record in the file of this patent:

UNITED STATES PATENTS

| Number | Name | Date |
|---|---|---|
| 1,448,950 | Uecker | Mar. 20, 1923 |
| 1,635,659 | Clement | July 12, 1927 |
| 1,832,042 | Mohr | Nov. 17, 1931 |
| 2,008,050 | Tampier | July 16, 1935 |
| 2,067,794 | Seyferth | Jan. 12, 1937 |
| 2,270,569 | Weiss | Jan. 20, 1942 |

FOREIGN PATENTS

| Number | Country | Date |
|---|---|---|
| 649,571 | Germany | Aug. 27, 1937 |